United States Patent
Hall et al.

(10) Patent No.: US 10,113,442 B2
(45) Date of Patent: Oct. 30, 2018

(54) METHOD OF RELEASING A FAN BLADE AND ASSEMBLY FOR RELEASING A FAN BLADE FROM A TURBOFAN ENGINE

(71) Applicant: Rolls-Royce Corporation, Indianapolis, IN (US)

(72) Inventors: Christopher Hall, Indianapolis, IN (US); Graham Burkholder, Indianapolis, IN (US); Xuekun Sun, Carmel, IN (US); Jeff Crutchfield, Indianapolis, IN (US); Ben Hodgson, Indianapolis, IN (US); Dennes Kyle Burney, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 383 days.

(21) Appl. No.: 15/211,964

(22) Filed: Jul. 15, 2016

(65) Prior Publication Data

US 2018/0016934 A1   Jan. 18, 2018

(51) Int. Cl.
| | |
|---|---|
| *G01M 15/14* | (2006.01) |
| *F01D 21/00* | (2006.01) |
| *F01D 5/34* | (2006.01) |
| *F01D 21/04* | (2006.01) |
| *F04D 29/32* | (2006.01) |
| *F04D 29/64* | (2006.01) |
| *F42B 3/00* | (2006.01) |

(52) U.S. Cl.
CPC ............ *F01D 21/003* (2013.01); *F01D 5/34* (2013.01); *F01D 21/045* (2013.01); *F04D 29/322* (2013.01); *F04D 29/644* (2013.01); *F42B 3/006* (2013.01)

(58) Field of Classification Search
USPC ....................................... 73/112.01
See application file for complete search history.

(56) References Cited

U.S. PATENT DOCUMENTS

| | | | |
|---|---|---|---|
| 7,445,433 B2 | 11/2008 | Chivers et al. | |
| 2010/0158693 A1* | 6/2010 | Viegas ..................... | F01D 5/282 416/223 R |
| 2012/0296575 A1* | 11/2012 | McMillan ............. | F01D 21/003 702/40 |
| 2015/0330246 A1* | 11/2015 | Whitehead ............ | F01D 5/3007 416/2 |
| 2018/0017065 A1* | 1/2018 | Hall ...................... | F04D 27/001 |

FOREIGN PATENT DOCUMENTS

EP         2206892         7/2010

* cited by examiner

*Primary Examiner* — Eric S McCall
(74) *Attorney, Agent, or Firm* — McCracken & Gillen LLC (57) ABSTRACT

According to one aspect, a method of releasing a fan blade for testing a turbofan engine includes providing an internal passage with a constant arc through an airfoil arranged about a blisk such that the constant arc of the internal passage aligns with a contour of the blisk. The method further includes packing the internal passage with a charge, modifying the airfoil such that the airfoil is released from the blisk evenly along a chordwise length of the airfoil, and detonating the charge such that the airfoil is released from the blisk at a selected time.

19 Claims, 7 Drawing Sheets

PRIOR ART

METHOD OF RELEASING A FAN BLADE AND ASSEMBLY FOR RELEASING A FAN BLADE FROM A TURBOFAN ENGINE

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to engines, and more particularly, to methods for detaching blades from turbofan engines.

BACKGROUND

Turbofan engines are frequently employed in aviation. In order for a turbofan engine to be effective in an aviation application, it is typically placed close to other critical portions of an aircraft. For example, a turbofan engine may be mounted on a wing thus placing the turbofan engine in close proximity with both the wing and the fuselage of the aircraft. Therefore, operation of such a turbofan engine must meet certain safety standards.

Safety standards and precautions for turbofan engines are important during all phases of operation, including start-up, shutdown, normal operation, and failure. Safety may be of particular concern during failure of the engine, especially when failure involves the fan itself. One type of failure condition is known as "fan blade off" "Fan blade off" refers to separation of a fan blade from the turbofan shaft. During a fan blade off event, a containment case housing the turbofan engine, specifically around the fan, is expected to prevent the fan blade from travelling along a path that damages the wing or fuselage.

Figure 1:
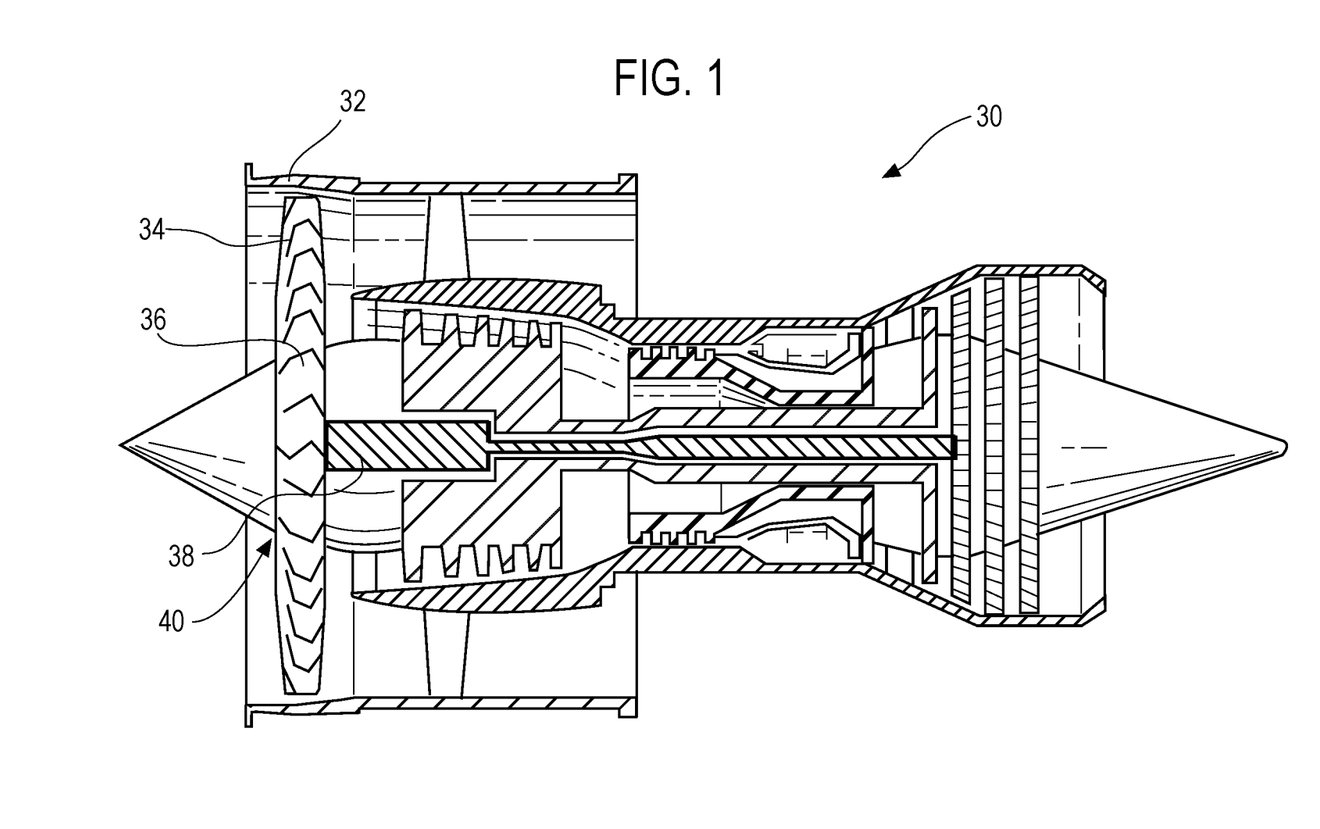
FIG. 1 shows cross-section of a turbofan engine.
Figure 2:
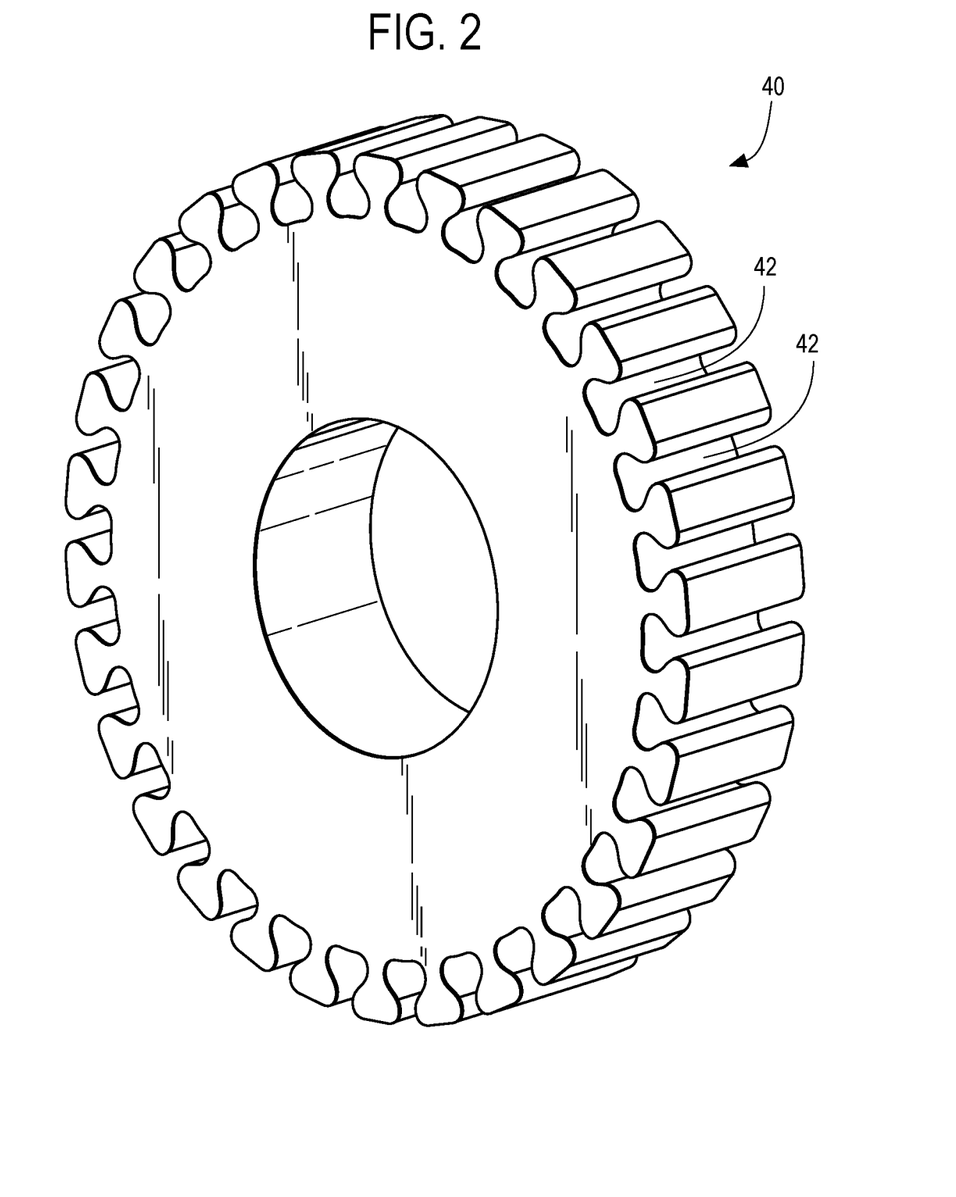
FIG. 2 shows an isometric view of a turbofan rotor disk.
Figure 5:
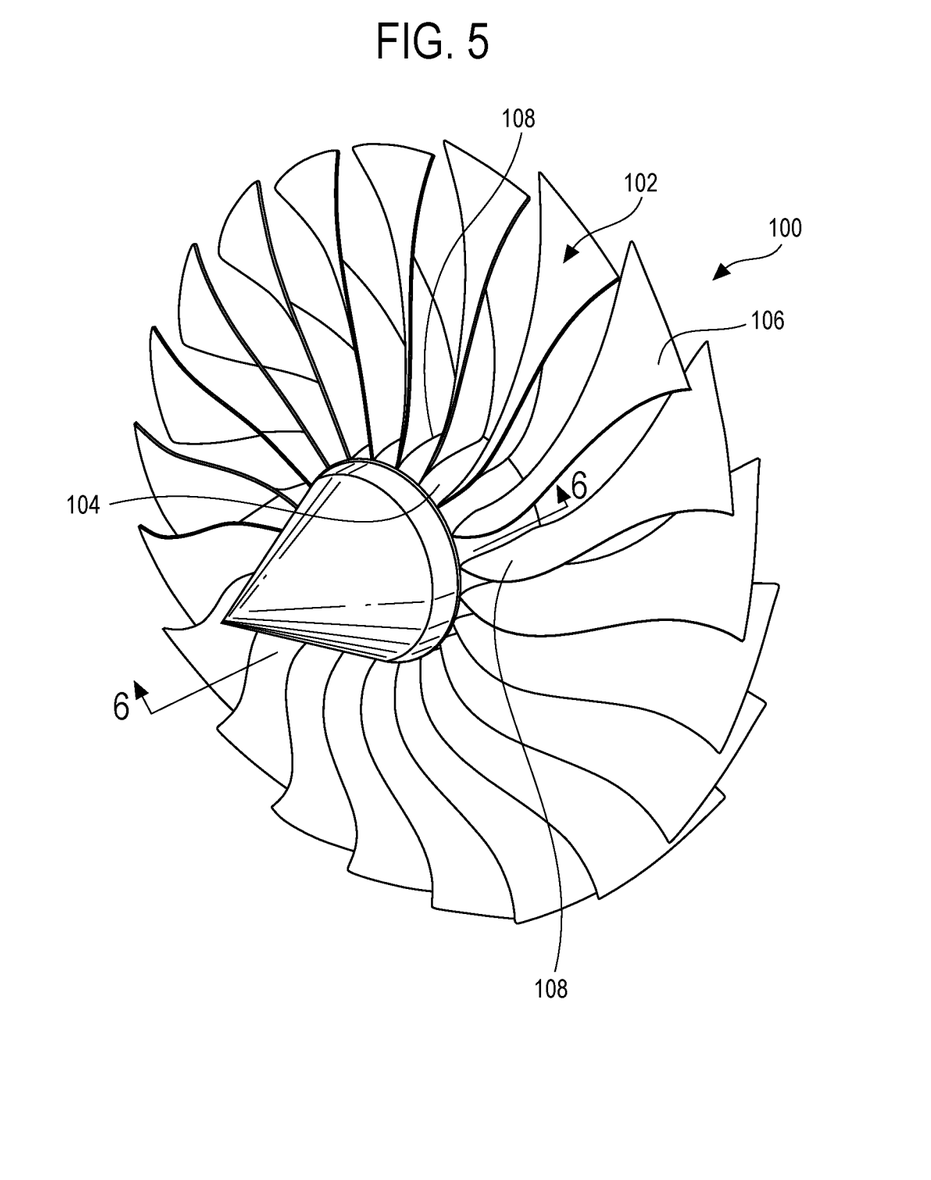
FIG. 5 shows an isometric view of the blisk turbofan.

Referring now to the prior art design shown in FIG. 1 a typical turbofan engine 30 is illustrated. The turbofan engine 30 includes a fan containment case 32 surrounding a turbofan 34 and a number of compressor stages. The fan blade(s) 36 are secured to a shaft 38 by way of a rotor disk or hub 40, as seen in FIG. 2, during normal operation. Conventional turbofan engines employ fan blade(s) 36 that are not integral to the rotor disk 40. Instead, the fan blade(s) 36 are individually joined to the rotor disk 40 by dovetail joints. The rotor disk 40 has mounting slots 42 arranged around an exterior surface thereof. A fan rotor with an integral plurality of fan blades permanently connected to the fan disc is often termed a "blisk", or bladed disc (FIG. 5). This style of fan rotor may be functionally desirable as compared with a conventional style separable fan rotor and is discussed further subsequently.

Figure 3:
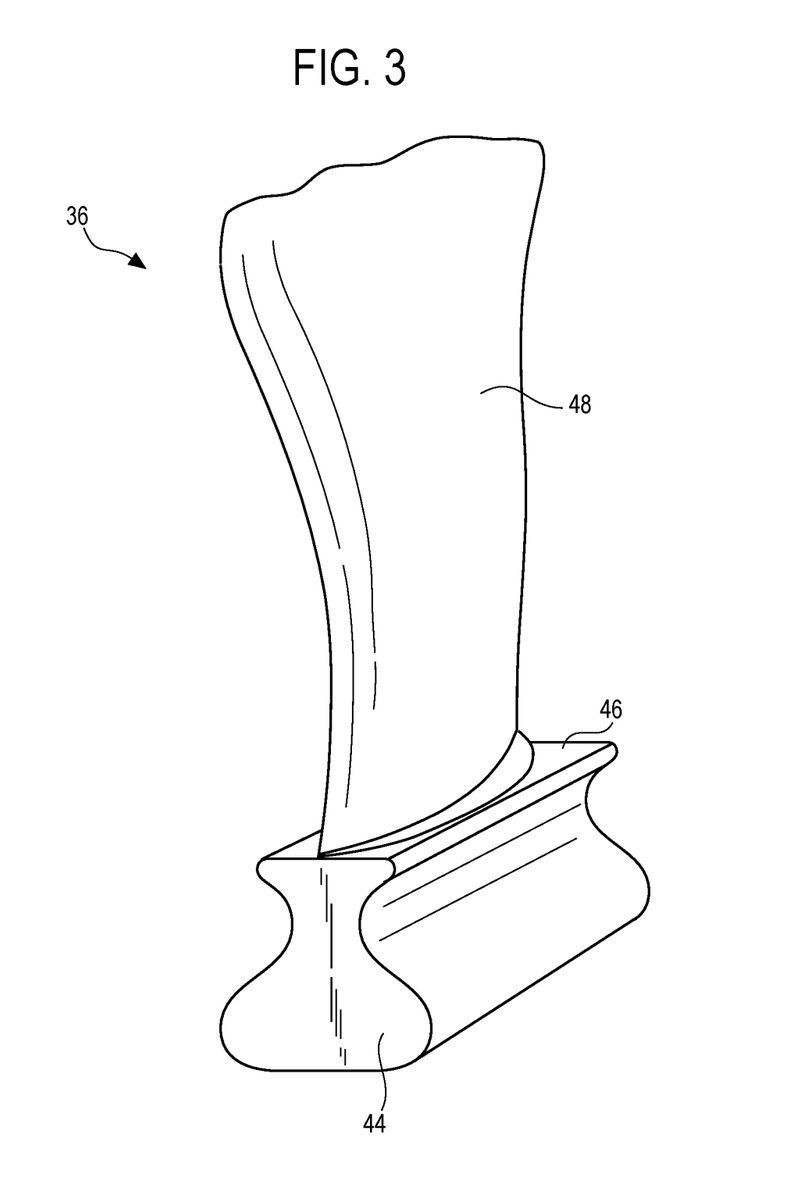
FIG. 3 shows an isometric view of an individual conventional fan blade.

As seen in FIG. 3, each fan blade 36 includes blade root 44, a blade platform 46, and an airfoil 48. The fan blade root 44 of each fan blade 36 slides into the respective mounting slot 42 such that the root 44 is mostly within the associated mounting slot 42. The blade platform 46 is outside of the mounting slot 42 but remains in close proximity with the rotor disk 40. Blade platforms 46 of adjacent fan blades 36 align very close to one another. The airfoil 48 extends away from the blade platform until the tip thereof terminates just before reaching the interior surface of the turbofan case 32, as shown in FIG. 1.

During normal operation, the shaft 38 rotates thereby rotating the rotor disk 40. The rotor disk 40 in turn produces the rotation of the fan blade(s) 36 around the shaft 38. However, occasionally the engine experiences a fan blade off event as discussed hereinabove. Upon separation from the shaft 38, the fan blade 36 strikes the case 32. During the fan blade off event, the fan blade travels in both a radial/circumferential and possibly axial, although axial movement may be undesirable, direction away from the turbofan shaft 38. This movement results in the fan blade moving out towards the fan case barrel. The fan blade 36 escaping from the fan case 40 is a safety hazard and may result in damage to the fuselage or wing caused by an impact from the escaped fan blade 36. Therefore, it is an objective of engine design to contain a separated fan blade 36 during a fan blade off event. Some engine certifications are tied to accomplishing this objective.

Figure 4:
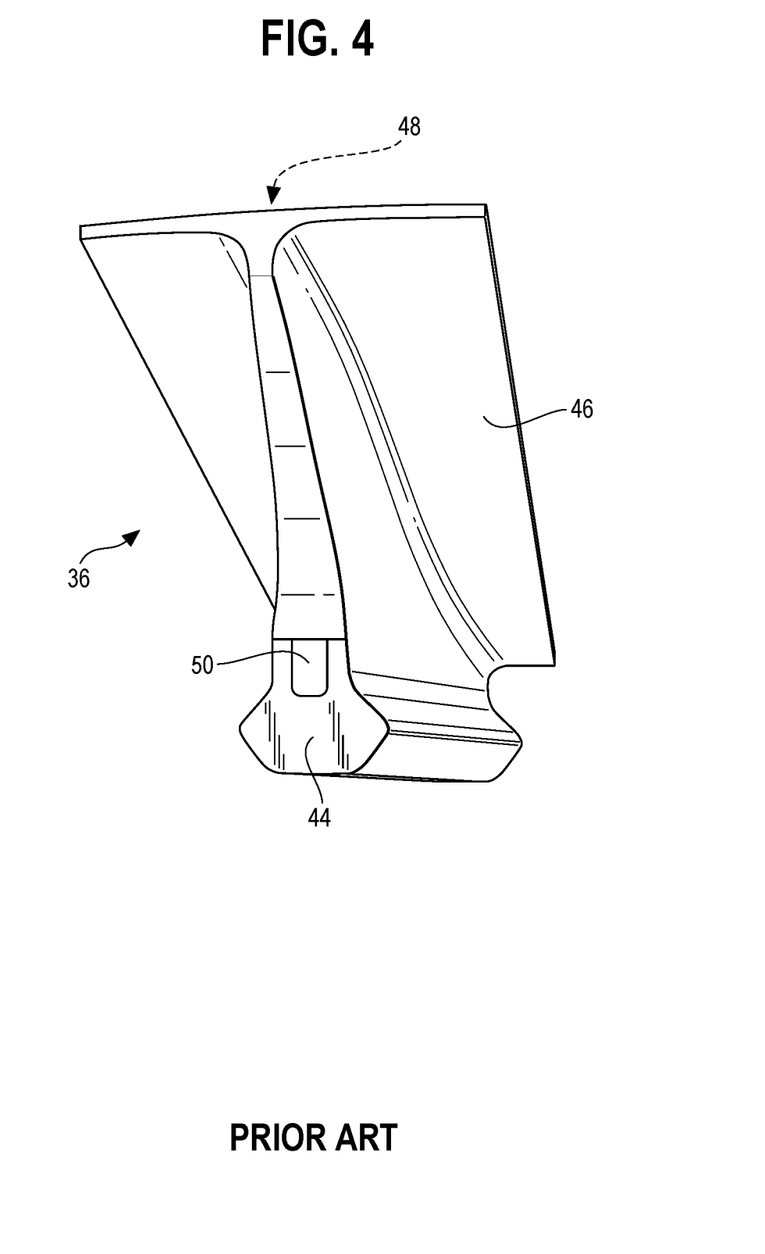
FIG. 4 shows a cross-section of a conventional separate fan blade with a hole through the fan blade stalk.

A need exists for testing turbofan engines and the casings thereof during fan blade off events. Such testing is performed by causing the fan blade(s) 36 to separate from the rotor disk 40 under controlled/observable test conditions. Explosives may be used to cause this separation. Referring now to FIG. 4, a prior art method for separating a fan blade 36 from the rotor disk 40 is depicted. A straight hole 50 is drilled in the thick portion of the fan blade 36 between the blade root 44 and before the blade platform 46. This is referred to as the "stalk" in a conventional blade and is omitted from a blisk style blade. In this illustration, the airfoil 48 is out of view above the platform 46. The thickness of the fan blade 36 proximal the blade root 44 allows for a hole to be drilled near the blade root 44 and likewise easily filled with an explosive charge suitable for causing separation of the fan blade. This is possible because the thickness of the blade stalk allows for the hole 50 to be easily drilled wide enough that ample explosive material may be used to indiscriminately release the fan blade 36 upon detonation or deflagration. Furthermore, in conventional turbofan engines a common failure point is the stalk or root 44 and dovetail joint because this connection point between the fan blade 36 and the rotor disk 40 experiences significant stress during operation.

SUMMARY

According to one aspect, a method of releasing a fan blade for testing a turbofan engine includes providing an internal passage with a constant arc through an airfoil arranged about a blisk such that the constant arc of the internal passage aligns with a contour of the blisk. The method further includes packing the internal passage with a charge, modifying the airfoil such that the airfoil is released from the blisk evenly along a chordwise length of the airfoil, and detonating the charge such that the airfoil is released from the blisk at a selected time.

According to another aspect, an assembly for releasing a fan blade from a turbofan engine during testing includes an internal passage through an airfoil wherein the internal passage aligns with a contour of the airfoil and a charge is arranged within the internal passage. Also in the assembly, the airfoil is modified by extricating one or more portions of material from selected locations, and the airfoil is further modified at a leading edge and a trailing edge thereof such that the internal passage passes through the airfoil without breeching one or more sidewalls of the airfoil.

Other aspects and advantages will become apparent upon consideration of the following detailed description and the attached drawings wherein like numerals designate like structures throughout the specification.

DETAILED DESCRIPTION

Referring again to FIG. 1, a turbofan engine 30 is shown with a fan 34 and fan case 32. As described above, during a fan blade off event, the fan blade 36 travels in both a circumferential and radial direction away from the shaft 38. This movement results in the fan blade 36 moving out through a fan track liner. It is an objective of the fan case 32 to contain the radial and axial movement of the separated fan blade 36 and keep the fan blade 36 from escaping the fan case 32. It is desirable to test the turbofan engine 30 during a fan blade off event. As discussed with reference to FIG. 4 hereinabove, the existing methodology for fan blade release typically requires the drilling of a hole through the fan blade 36 at or near the relatively thick area of the blade root 44.

Figure 6:
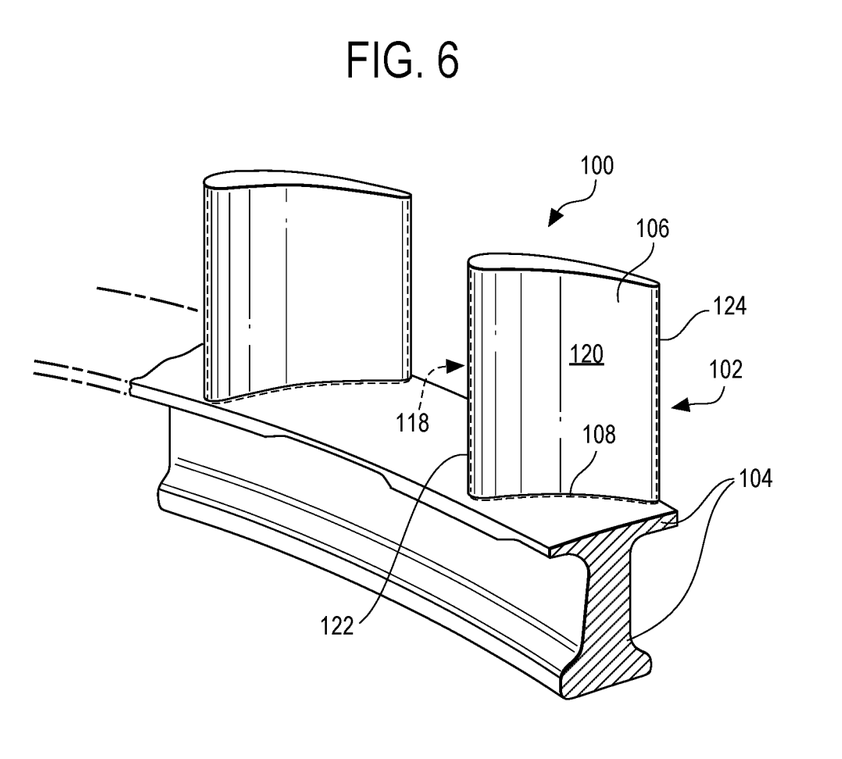
FIG. 6 shows a cross-sectional view of a blisk turbofan.

The turbofan engine 30 may use conventional fan blades 36 that attach to the rotor disk 40 at a dovetail joint, as described above. However, the turbofan engine 30 may instead use an integrally bladed rotor or bladed disk ("blisk"). Referring to FIGS. 5 and 6, a blisk 100 is shown. The blisk 100 comprises a single component.

The conventional fan 34 is an assembled component including the rotor disk 40 and a plurality of individual fan blades 36 removably inserted into the respective mounting slots 42, as seen in FIGS. 2 and 3. Whereas the conventional fan 34 is assembled from a number of separate parts including numerous connection points and interfaces, the blisk 100 (FIG. 5) is integrally formed. Blisks may be machined from a single piece of metal, forged or cast as one part, or welded together into a single piece. The unique nature and manufacture of the blisk 100 may affect how the turbofan 30 experiences failure. Particularly, a fan blade off event for the blisk 100 may be different from that of that of the conventional turbofan 34. Likewise, testing the turbofan engine 30 during a fan blade off event with the blisk 100 may be desirable. Such testing being ultimately required for certain certifications.

Referring to FIG. 6, the blisk 100 is shown in partial cross-section along the line 6-6. As compared to the conventional fan blade root 44, a blisk fan blade 102 may be thinner where it connects to a blisk hub 104. However, the blisk fan blade 102 further employs an airfoil shape having varying thickness rather than a straight region as in the stalk 44 of the conventional fan blade 36. The absence of a dovetail joint results in removal of the blade root 44 as embodied by the example conventional fan blade 36 of FIG. 3. While the fan blade 36 depicted in FIG. 3 is an example conventional fan blade 36, changes in shape and joint configuration do not alter the underlying principle of comparison and overall structural differences of the conventional fan blade 36 as contrasted with the blisk fan blade 102. The conventional fan blade 36 may include a fir tree joint, a curved blade root, a linear blade root, a shaped blade root, or any other suitable root.

However, regardless of the shape or specific configuration of the fan blade root 44 of the conventional fan blade design 36 it is absent from the blisk fan blade 102 at least insofar as the blisk fan blade 102 is airfoil shaped instead of straight and may be thinner where it connects to the blisk hub 104. In point of fact, the blisk fan blade 102 may only reach a maximum thickness at a structural connection point 108 between a blisk fan airfoil 106 and the blisk hub 104, as seen in FIG. 6. As the blisk fan airfoil 106 extends away from the blisk hub 104 a thickness thereof decreases until termination of the fan blade 102 at a respective fan blade tip.

Likewise, the absence of the blade root 44 and the dovetail joint further results in the removal of the blade platform 46 as it is embodied in FIG. 3. Instead, referring now to FIG. 6, the blisk fan airfoil 106 connects directly with the blisk hub 104 at the structural connection point 108. In the conventional turbofan 34 design, the blade platform 46 provides an aerodynamic inner flow path for air travelling over the platforms through the fan stage. The blade platforms 46 of adjacent fan blades 36 are arranged to align with minimal gaps therebetween, creating a surface that is as smooth as possible for air to flow over.

The configuration of the blade platforms 46 provides a secondary surface that has aerodynamic qualities surrounding the numerous connection points of the conventional turbofan design, which otherwise would have joints, mounting slots 42, and blade roots 44 exposed to the airflow through the turbofan 34 stage. However, in a blisk design, blade platforms 46 are not included, once again because the blisk fan airfoil(s) 106 attach directly to the blisk hub 104 at the structural connection point 108. Therefore, an analogous aerodynamic inner surface for the blisk 100 turbofan design is provided by the outer surface of the blisk hub 104. In addition, the stalk 44 is omitted from the blisk 100 since there is no need to join the blade and disc through the dovetail joint.

Removal of the blade platform 46 and blade stalk 44 in a blisk 100 generally results in aerodynamic improvements and weight reduction. Furthermore, the changes resulting from the blisk design 100 alter the failure points of the turbofan engine 30. During a fan blade off event, the blisk fan blade 102 may fail at or near the connection point 108. In contrast, the conventional fan blade 36 fails at or near the blade root or stalk 44 thus releasing the blade platform 46 and the root 44 portion along with the conventional airfoil 48. Therefore, as compared with the conventional bladed turbofan 34 design, a fan blade off event for the blisk 100 may involve a smaller and lighter projectile at least as regards a root portion. The released blisk fan blade 102 does not include the blade platform 46 or the root/stalk 44 portion.

The fan blade off event of the blisk turbofan design 100 may be tested either with a full or partial blisk or may be simulated by releasing only the airfoil 48 from the conventional fan blade 36. This testing approach may be referred to as a simulated blisk fan airfoil 110. However, the thin blisk fan blade 102 as well as the thin airfoil 48 (simulated blisk fan airfoil 110) of the conventional design do not provide sufficient material or space to enclose a chordwise hole while still maintaining structural integrity during start-up and operation of the turbofan engine 30 prior to airfoil 106, 110 release. Furthermore, the conventional method as described with reference to FIG. 4 does not allow for the release of the blisk airfoil 106 or simulated blisk fan airfoil 110 in a well-timed and precise manner for a turbofan containment case fan blade off validation test of a blisk fan design. Further details on methods for fan blade release are disclosed in co-pending application Ser. No. 15/212,027, entitled "Method for Release of Fan Blisk Airfoil with External Shaped Charge" filed herewith, the disclosure of which is hereby incorporated by reference herein.

Figure 7:
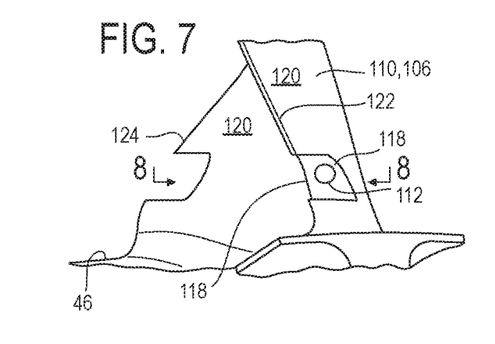
FIG. 7 shows an isometric view of a portion of a fan blade from a blisk turbofan as seen from a leading edge thereof and having an internal passage way travelling therethrough.
Figure 8:
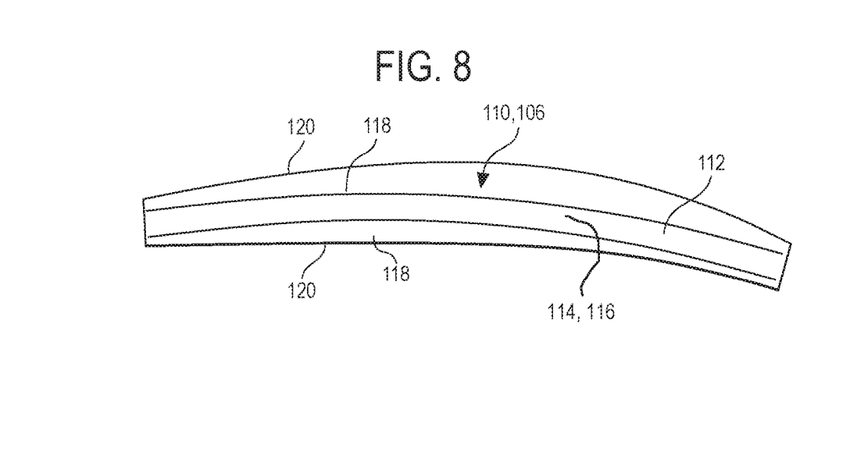
FIG. 8 shows a diagram of a cross-sectional view of the fan blade as viewed from above and depicting a path of the internal passage way.

Referring now to FIGS. 7 and 8, an internal passage way 112 provided by a 3D swept hole having a constant arc radius may be constructed in a generally chordwise direction. The internal passage way 112 may be packed with a charge of explosive material 114 or detonating cord 116 to provide an explosion for releasing the blisk fan airfoil 106 or simulated blisk fan airfoil 110 in a well-timed manner such that an accurate and precise containment test during a fan blade off event may be performed on a blisk fan design.

Detonating material may be comprised of an explosive material in a shape charge configuration or in a detonating cord 116. Detonating cord is a thin, usually flexible, tube filled with high explosive while a shape charge may include explosive materials filled or inserted into the internal passageway 112. The detonating cord 116 may contain pentaerythritol tetranitrate (PETN), cyclotrimethylenetrinitramine (RDX), or another suitable high explosive. The swept hole of the internal passage way 112 in combination with the detonating cord 116 allows for release of the airfoil 106, 110 to be precisely and selectively timed as well as structurally even enough that release may be prescribed to a particular fan speed or such that the airfoil 106, 110 is released at a particular point or in a selected direction. It is desirable for the release of the airfoil 106, 110 to be well-timed so that such release may be effected at a particular, selected time during fan rotation corresponding to a specific circumferential location along the case 32. Precise control thereof increases the accuracy of containment case testing.

Occasionally, a new blisk airfoil design is not available for testing. Depending on the design constraints of a new blisk fan design, it may not be possible to locate a charge through the insufficient thickness of the airfoil 106. Alternatively, a new blisk fan design may simply not yet be fabricated for testing. For whatever reason, if a new blisk design is not yet available for testing, existing fan blades 36 may be used as simulated blisk fan airfoils 110, as mentioned hereinabove. For the simulated fan blisk airfoil 110, the internal passage way 112 is disposed at or near the blade platform 46 severing the airfoil 110 at the base thereof simulating the failure point of an operational blisk fan blade which does would not include the platform 46 and root 44 portion. It is not desirable to release the blade root 44 or blade platform 46 as this may invalidate the test due to excess energy and geometric differences. The simulated blisk fan airfoil 110 is released from the fan blade 36 above the blade platform 46 because the release of the platform 46 and blade root 44 includes more mass than release of the blisk fan airfoil 106 alone. The additional mass alters the trajectory and impact of the released projectile during a fan blade off containment case test.

Referring now to FIG. 8, a diagram depicts a cross-sectional view of the airfoil 106, 110 of FIG. 7 along line 8-8 as viewed from above. The internal passage way 112 follows the general contour of the airfoil connection point 108. In an example embodiment, the internal passage way 112 may be constructed using a multi-axis EDM (precision electrical discharge machining) along a constant arc path. If a constant arc path is used, it aligns with the general contour of the airfoil 106, 110 such that it does not partially or completely sever one or both sidewalls 118 of the airfoil 106 thereby creating stresses that would exceed structural allowables for proper function prior to fan blade release as the fan 100 is spun up to the desired operating speed, 110 and likewise, must be angled such that it does not stray into the blisk hub 104 or blade root 44, respectively. Therefore, the constant arc path of the internal passage way 112 is aligned in 3-dimensions. The 3-dimensional alignment includes avoiding the sidewalls 118 as well as being tilted about a pitch axis so as to align with the ramp of the blisk hub 104.

The constant arc path of the internal passage way 112 is precisely aligned such that neither sidewall 118 is breached or becomes so thin that the airfoil 106, 110 becomes detached before reaching the desired fan speed and/or executing the explosive release for testing. Moreover, alignment of the constant arc path of the internal passage way 112 is aligned such that the detonation of the charge 114 loaded into the internal passage way 112 does not cause the airfoil 106, 110 to release in an uneven or overly energetic manner. If the sidewall 118 is too thin at a particular point therealong, the airfoil 106, 110 may be severed at one end and remain attached for a brief period, or a relatively longer period, at the other end. Alternatively, imprecise alignment of the internal passage way 112 and the resulting modified sidewall 118 having insufficient thickness may result in detonation of the charge 114 propelling the airfoil 106, 110 into the containment case 32 rather than merely releasing the airfoil 106, 110. Propulsion of the airfoil 106, 110, or other alteration to the trajectory thereof, invalidates the containment case test similar to the inclusion of extra mass from the blade platform 46 or root 44.

Figure 9:
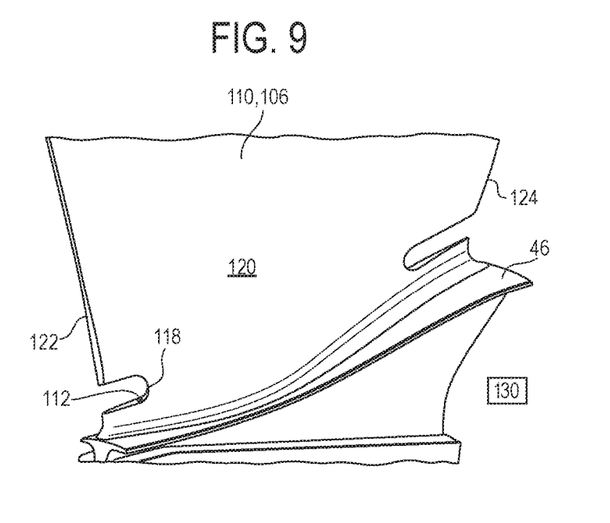
FIG. 9 shows an isometric view of a portion of the fan blade as viewed from the side and depicting modifications made thereto to accommodate the internal passage way.

Referring now to FIG. 9, in order to fabricate the internal passage way 112 such that the airfoil 106, 110 release is precisely timed and structurally even, the airfoil 106, 110 may need to be modified along the exterior surface 120 of the sidewalls 118 in alignment with the internal passage way 112. The airfoil 106, 110 may be modified by extricating one or more portions of material from the sidewalls 118 at one or more location therealong. The extricating may be performed with EDM (precision electrical discharge machining) or another suitable machining method. The machining method for modifying the airfoil 106, 110 may be the same or different from the machining method used to manufacture the internal passage way 112. Further, specific areas may need to be strategically weakened, such as near the structural connection point 108 or in alignment with the internal passage way 112. The strategic weakening of specific areas may need to align with portions of the airfoil 106, 110 that remain relatively thick as determined according to alignment of the constant arc path of the internal passage way 112 with the contour of a particular fan blade design. It may be inferred that such modification may be slightly different for application to different fan blade designs without straying from the general principles of this disclosure.

Further, modifications for interfacing to the charge 114 through one or both ends of the internal passage way 112 may be constructed by extricating portions of the airfoil 106, 110 at a leading edge 122 and a trailing edge 124. It may be beneficial for the internal passage way 112 to be of a particular diameter such that the appropriate quantity of explosive charge 114 fits therein. However, the leading edge 122 and the trailing edge 124 of the airfoil 106, 110 are relatively thinner as compared with the interior of the airfoil 106, 110. In order to begin manufacture of the constant arc at a point along (chordwise) the airfoil 106, 110 thick enough to accommodate the diameter of the internal passage way 112, material is removed from the leading and trailing edges 122, 124 of the airfoil 106, 110 until such point of suitable thickness is reached.

Furthermore, modification of the airfoil 106, 110 may be necessary to fit or mount associated components required to detonate the charge 114. Detonator(s) are arranged generally proximal the leading and trailing edges 122, 124 of the airfoil 106, 110. Detonator holder(s) and/or detonator(s) including one or more detonation mechanism(s) may be mounted on one or both of the leading and trailing edge 122, 124 in cutouts left behind when portions of the airfoil 106, 110 are extricated according to the above disclosure. On one or both ends 122, 124 the detonator holder and detonation mechanism may trigger the detonating cord 116 running the length of the internal passage way 112. Even with the almost instantaneous detonation rate of detonating cord 116, detonation from both ends 122, 124 may be desirable in order to assist in the timing and even release of the airfoil 106, 110. Further, the detonator(s), detonation controller 130 (FIG. 9), and the strategic weakening of the airfoil 106, 110 may operate in combination to ensure that the release of the airfoil 106, 110 is performed in accordance with the selected time and/or at a selected radial speed and/or angle of the blisk 100. The detonator(s) may be controlled such that detonation occurs simultaneously at both the leading edge 122 and the trailing edge 124 or according to another pattern in order to release the airfoil 106, 110 at a selected time and angle.

The detonator holder(s) may assist in transferring the energy from the detonation mechanism(s) to each end of the internal charge 114. The charges may be arranged to sever the airfoil 106, 110 substantially transverse to the radial extent thereof. In an alternative embodiment wherein the detonating cord 116 is not utilized, detonator holder(s) may further carry a primary explosive. In this embodiment, the detonator holder holds the detonation mechanism in contact with the primary explosive and stimulation of the primary explosive triggers the charge 114 arranged within the internal passage way 112. Further in such an embodiment, it may be desirable to utilize detonator holder(s) arranged at both the leading and trailing edges 122, 124. Since a traditional detonator may operate with a slower or less precise response time in triggering the charge 114 in the internal passage way 112, detonation from both ends further assists in the well-timed and even release of the airfoil 106, 110.

The detonator holder(s), detonation mechanism(s), and/or the detonating cord 116 may be in communication with the detonation controller 130. The detonation controller 130 may be located proximal the airfoil 106, 110 or may be remote therefrom. The detonation controller 130 may communicate with the detonation mechanism(s) by RF communication or may be otherwise configured to be in electrical or mechanical communication therewith. The detonation controller 130 may further provide for detonation at a selected time. Further, the detonation controller 130 operates in conjunction with modifications of the airfoil 106, 110 such that the detonating of the charge 114 in combination with the modifications of the airfoil 106, 110 releases the airfoil 106, 110 at a known and selected time and angle.

The embodiment(s) detailed above may be combined in full or in part, with any alternative embodiment(s) described.

INDUSTRIAL APPLICABILITY

In summary, the present disclosure contemplates an internal passage way for carrying explosives and/or detonating cord to sever a blisk fan airfoil or a simulated blisk fan airfoil during testing of a containment case. The internal passage way may have multiple detonators for initiating the explosive materials at more than one point along the fan blade so as to increase the evenness and uniformity with which the fan blade is released. Likewise, an arrangement including more than one charge and more than one detonator provides for accurately timing the release of a fan blade such that an associated containment case for housing the blisk fan blade may be tested at selected points therealong. The shape of the blade used, the type of explosive charge used, the detonator used, the size of the leading edge and trailing edge cutouts formed by extricating one or more portions of material from the airfoil 106, 110, and the selected arc of the internal passage way may all be modified to fit a particular fan blade application or simulate a specific type of fan blade off event. For example, the radial location of the internal passage way may be moved along the length of the airfoil (nearer or further from the blisk hub or blade root) such that more or less mass is released with the airfoil to simulate the desired weight/mass of a new blisk fan design for testing.

Furthermore, the timing of the fan blade release may be modified such that one end of the airfoil is released before another end. Likewise, the timing of the fan blade release may be modified such that the airfoil is released during powering up of a turbofan engine to be tested, during powering down of a turbofan engine to be tested, while a turbofan engine to be tested is operating at a maximal speed, or while a turbofan engine operates at a selected fan speed. Moreover, in order to accommodate the changes in shape or material used in the internal passage way described above, modification and strategic weakening of the airfoil may be application specific. The detonator(s), detonation controller, and the strategic weakening of the airfoil may operate in combination to ensure that the release of the airfoil is performed in accordance with the selected time and/or at a selected radial speed and/or angle of the blisk. The arc of the passage way, the starting point of the passage way, and the diameter of the passageway may be customized all while adhering to the general principles of the design disclosed herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A method of releasing a fan blade for testing a turbofan engine, comprising:
   providing a blisk airfoil;
   providing a hole in the blisk airfoil at least partially aligned with a contour of the blisk airfoil;
   packing the hole with an explosive charge such that at least an outside portion of the explosive charge is surrounded by the blisk airfoil and disposed within the hole;
   modifying the blisk airfoil such that at least a portion of the blisk airfoil is releasable along a chordwise length of the blisk airfoil; and
   detonating the explosive charge such that at least substantially all of the portion of the blisk airfoil is released at a selected time.

2. The method of claim 1, further comprising:
   extricating a first portion of material from a leading edge of the blisk airfoil; and
   extricating a second portion of material from a trailing edge of the blisk airfoil;
   wherein sufficient material is extricated from the leading edge and the trailing edge such that a diameter of the hole is disposed within a width of the blisk airfoil along the chordwise length of the airfoil.

3. The method of claim 2, further comprising:
   selectively extricating an additional portion of material from one or more sidewalls of the blisk airfoil;
   wherein the additional portion of extricated material is aligned with the hole; and
   wherein the additional portion of extricated material weakens a structural connection of the blisk airfoil.

4. The method of claim 2, further comprising:
   detonating the explosive charge with one or more detonators;
   wherein the one or more detonators are mounted proximal the leading edge or the trailing edge.

5. The method of claim 4, wherein one or more of the detonators and the explosive charge comprise detonating cord.

6. The method of claim 4, further comprising:
   detonating the explosive charge at the leading edge and the trailing edge; and
   timing the detonating such that the blisk airfoil is released evenly along the chordwise length of the blisk airfoil.

7. The method of claim 6, further comprising:
   timing the detonating such that the explosive charge is detonated at the leading edge and the trailing edge simultaneously.

8. The method of claim 4, further comprising:
   controlling the detonating of the explosive charge with a detonation controller operatively coupled to the one or more detonators;
   timing the detonating of the explosive charge such that the blisk airfoil is released during rotation of the turbofan engine at the selected time such that the selected time corresponds to a specific circumferential location on a case surrounding the turbofan engine.

9. The method of claim 8, further comprising:
   selectively extricating an additional portion of material from the sidewalls of the blisk airfoil such that the detonating of the explosive charge releases the blisk airfoil at the selected time corresponding to a known radial speed and angle.

10. The method of claim 1, wherein the step of providing a hole comprises the step of forming the hole by electrical discharge machining.

11. The method of claim 10, further comprising the step of extricating the additional portion of material from the one or more sidewalls of the blisk airfoil by a manufacturing method other than the electrical discharge machining utilized in producing the hole.

12. An assembly for releasing a fan blade from a turbofan engine during testing, comprising:
    a curved internal passage through an airfoil wherein the curved internal passage aligns with a contour of the airfoil; and
    an explosive charge arranged within the curved internal passage;
    wherein the airfoil is modified at a leading edge and a trailing edge thereof and at least a portion of the curved internal passage is fully surrounded by and disposed entirely within the airfoil without breaching one or more sidewalls of the airfoil.

13. The assembly of claim 12, wherein a first portion of material is extricated from the leading edge and a second portion of material is extricated from the trailing edge such that a diameter of the curved internal passage is within a width of the airfoil along a chordwise length of the airfoil.

14. The assembly of claim 13, further comprising:
    one or more detonators operatively coupled to the explosive charge;
    wherein the one or more detonators are mounted proximal the leading edge or the trailing edge.

15. The assembly of claim 14, wherein one or more of the detonators and the explosive charge comprise detonating cord.

16. The assembly of claim 13, wherein an additional portion of material is selectively extricated from the one or more sidewalls of the airfoil such that the detonating of the explosive charge releases the airfoil at a selected time and angle.

17. The assembly of claim 12, further comprising:
    a detonation controller, wherein the one or more detonators are operatively coupled to the detonation controller; and
    wherein the detonation controller times the detonating of the one or more detonators such that the detonating of the explosive charge releases the airfoil at a selected time and angle.

18. The assembly of claim 17, wherein the detonation controller operates in conjunction with modifications of the airfoil such that the detonating of the explosive charge in combination with the modifications of the airfoil releases the airfoil at the selected time and angle.

19. The assembly of claim 17, wherein the detonation controller detonates the one or more detonators simultaneously.

* * * * *